United States Patent
Goetz et al.

(10) Patent No.: US 7,373,224 B2
(45) Date of Patent: May 13, 2008

(54) BRAKE MONITORING SYSTEM FOR HEAVY VEHICLES

(75) Inventors: Howard V. Goetz, Tigard, OR (US);
Dennis A. Duffy, Vancouver, WA (US);
Randall J. Goetz, Portland, OR (US);
Andrew Rady, Clackamas, OR (US)

(73) Assignee: SafetyWatch Technologies, Inc., Tualatin, OR (US)

( * ) Notice: Subject to any disclaimer, the term of this patent is extended or adjusted under 35 U.S.C. 154(b) by 685 days.

(21) Appl. No.: 10/898,482

(22) Filed: Jul. 22, 2004

(65) Prior Publication Data

US 2006/0020377 A1 Jan. 26, 2006

(51) Int. Cl.
*G06F 19/00* (2006.01)

(52) U.S. Cl. ............ 701/29; 701/36; 188/2 R; 188/1.11 R (58) Field of Classification Search ........ 701/29, 701/36; 188/2 R, 1.11 L, 1.11 R; 303/152; 340/453–454, 500, 507, 517
See application file for complete search history.

(56) References Cited

U.S. PATENT DOCUMENTS

| 4,800,991 | A |   | 1/1989 | Miller |
|-----------|---|---|--------|--------|
| 4,855,712 | A | * | 8/1989 | Wiley et al. ............ 340/453 |
| 4,937,554 | A |   | 6/1990 | Herman |
| 5,285,190 | A |   | 2/1994 | Humphries et al. |
| 5,433,296 | A | * | 7/1995 | Webberley .......... 188/1.11 L |

* cited by examiner

*Primary Examiner*—Yonel Beaulieu
(74) *Attorney, Agent, or Firm*—Robert D. Varitz, PC (57) ABSTRACT

A brake monitoring system for use on a motor vehicle includes a sensor connected to each brake actuator shaft on the motor vehicle for monitoring the position and travel of the brake actuator shaft and for generating and transmitting a brake condition signal; a data processor carried in an axle box associated with each axle and connected to sensors associated with brakes for the axle for receiving, interpreting, storing, and upon request, transmitting the brake condition signal, wherein each data processor includes an auto-address mechanism to identify its position on the vehicle; and a master station, wherein said master station includes a display for identifying a particular vehicle brake, a quantitative indication of the travel on the brake actuator shaft associated with the particular brake, and wherein said visual indicating devices include plural indicia which are indicative of said safety condition of a particular brake.

19 Claims, 4 Drawing Sheets

BRAKE MONITORING SYSTEM FOR HEAVY VEHICLES

FIELD OF THE INVENTION

This invention relates to monitoring systems for multi-axle, heavy vehicles, such as trucks and busses, and specifically to a system which automatically identifies the number of axles and brakes on a vehicle to be monitored.

BACKGROUND OF THE INVENTION

Although the primary intended use of this invention is on large trucks and tractor-trailer combinations, it should be appreciated that the invention is also suitable for use on all vehicles which have independent brakes for each wheel, such as vehicles which generally incorporate an air-brake system. These brakes must be properly adjusted in order properly to function. Various standards have been set by state governments and the Federal Department of Transportation (DOT) to insure that brakes are properly adjusted and are therefore operable to stop these heavy vehicles when the need arises.

One standard that has been set by the DOT is a requirement that the travel of an actuator rod, which extends from a brake air cylinder to an activation arm on the brake mechanism, have a travel distance of two inches or less. A brake is deemed to be out of adjustment if the activation arm travel is two or more inches. Travel distances between 1.75 inches and two inches are considered to be marginally safe, although a travel distance of less than 1.75" is preferable.

Newer vehicles have self-adjusting brakes. It is estimated that, at this time, approximately fifty percent of the vehicles on the road have such self adjustors. Even with the self-adjusting brakes, the slack adjustors, as they are known in the trade, will sometimes fail to operate or will become inoperative as a result of the build up of petrochemical products, dirt or ice in the slack adjustment mechanism, which allows brakes to be out of adjustment. Older vehicles do not have any self-adjustment mechanism. Regardless of whether the vehicle is equipped with slack adjustors or not, it is a requirement that the driver physically inspect the brakes on the tractor and trailer(s) to insure that they are properly adjusted and are properly operating. As might be expected, this task is not always performed, particularly in inclement weather conditions. If, however, a brake is determined to be out of adjustment, it may be quickly adjusted by the truck operator, with a minimal expenditure of energy and with the use of a few hand tools.

Vehicle brakes are inspected at check points, such as the familiar weigh stations which are found along highways. As in the case of the driver, an inspector must generally crawl under the truck to inspect the travel of the actuator arms to insure that they are in compliance with federal and state regulations. Such inspection must be done for each brake on the vehicle, which generally requires that the driver remain in the truck and operate the brakes while the inspector visually checks each brake mechanism.

A number of monitoring devices have been provided for use on trucks. Some of these monitor air pressure to determine if the brakes are operating safely, others provide a warning only after the brake travel has exceeded legal limits, while still others provide a purely visual indication which still requires the operator to visual check every brake on the truck.

There have been a few attempts to build and market such systems in the industry, however, all known systems suffer from one or more serious defects. Some require extensive and expensive modifications to the vehicle and brake system, others are difficult or inconvenient to use, and still others are not readily adaptable to the wide variety of axle configurations found on modern trucks.

What is needed then is a automatic brake-travel monitoring system that is simple and reliable, easy for the operator to use, is inexpensive to install and maintain, and is readily adaptable to various axle configurations.

U.S. Pat. No. 5,285,190 for Automatic slack adjuster with operation and adjustment monitor, to Humphries, et al., granted Feb. 8, 1994, disclosed an automatic slack adjustor which incorporates a monitoring system alerting the vehicle operator that a brake somewhere on the vehicle is not operating properly, or is out of adjustment, but does not provide any mechanism for identifying the specific brake that is out of adjustment, nor does the system identify any quantitative information about a particular brake.

U.S. Pat. No. 4,937,554 for Electronic brake monitoring system and method, to Herman, granted Jun. 26, 1990, provides a monitoring system which incorporates a push rod oscillator-type sensor to provide an analog output which is related to the push rod extension distance, which output is used along with pressure in the brake system to determine whether or not a brake is operating properly.

U.S. Pat. No. 4,800,991 for Brake maintenances monitor to Miller, granted Jan. 31, 1989, discloses a system which utilizes a mechanical flag to provide an indication that the brake actuator arm has exceeded its safe distance. Additionally, an electronic warning device is provided which will momentarily provide a warning light on the dashboard of the vehicle.

U.S. Pat. No. 5,433,296 for Brake monitoring system, to Webberley, granted Jul. 18, 1995, discloses a system which provides a readout to an operator of a motor vehicle.

SUMMARY OF THE INVENTION

A brake monitoring system for use on a motor vehicle, wherein the vehicle includes plural, powered brakes mounted adjacent a wheel carried on an axle, and wherein each brake include a brake actuator shaft and a mechanism for shifting the brake actuator shaft between a brake-off position and a brake-applied position includes a sensor connected to each brake actuator shaft on the motor vehicle for monitoring the position and travel of the brake actuator shaft and for generating and transmitting a brake condition signal representative of a safety condition of the brake associated with the brake actuator shaft, wherein said brake condition signal includes quantitative information about the length of travel of the brake actuator shaft; a data processor carried in an axle box associated with each axle and connected to sensors associated with brakes for the axle for receiving, interpreting, storing, and upon request, transmitting said brake condition signal, wherein each data processor includes an auto-address mechanism to identify its position on the vehicle; and a master station, wherein said master station includes a display for identifying a particular vehicle brake, a quantitative indication of the travel on the brake actuator shaft associated with the particular brake, and wherein said visual indicating devices include plural indicia which are indicative of said safety condition of a particular brake, including visual and auditory indicating devices connected to said data processor for warning a vehicle operator of said safety condition of the brakes on the vehicle, wherein said visual indicating devices provide both quantitative and qualitative output to the motor vehicle operator for every brake on the vehicle, wherein said master station includes a function selector located in said master station for selecting the various axles on the vehicle for display of brake condition for a selected axle.

It is an object of the invention to provide a brake monitoring system for heavy vehicles which is adaptable to new and old vehicles.

Another object of the invention is to provide a monitoring system which will automatically identify and address all brakes on a vehicle to be monitored.

An object of the invention is to provide an automatic brake-travel monitoring system that is simple and reliable, easy for the operator to use, is inexpensive to install and maintain, and is readily adaptable to various axle configurations.

An object of the instant invention is to provide a brake monitoring and warning system which will provide a continuous check on the safety condition of the brakes on the vehicle.

Another object of the invention is to provide a system which provides a remote visual and auditory warning if a brake is out of adjustment.

A further object of the invention is to provide a system which provides a quantitative display of the travel of any given brake on the vehicle and provides information to the operator as to the overall operating condition of the brake system for the vehicle.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

There are three features of the system of the invention described herein. The first is a brake-travel monitoring system, which is applicable to a vehicle having any number of axles. The second is a sensor installed adjacent a wheel to monitor brake travel. The third is an automatic and adaptive addressing system for monitoring individual brakes in a multiple axle vehicle.

Brake Travel Monitoring System

It is desirable to monitor heavy vehicle brakes for safe operation. In large trucks, fairly common and very dangerous situations occur when one or more of the wheel brakes become inoperative. This is usually a result of failure of the automatic brake slack-adjusting mechanism, or failure of a driver to insure proper brake adjustment. When excessive brake travel occurs, eventually the brake shoes no longer properly contact the brake drums, and the brakes become inoperative.

The key symptom of this problem is excessive travel of the brake actuation linkage. For normal bake systems, travel distances of two inches or more indicate failure of the slack-adjusting mechanism.

The system of the invention described here in includes of three major components:
1. a brake-travel sensors—one for each brake actuator, typically two per axle;
2. a brake sensor "axle box"—one per axle; and
3. A "master station"—the control/display for the system, which is normally mounted in the driver's or operator's area.

The system of the invention is a brake monitoring system for use on a motor vehicle, wherein the vehicle includes plural, powered brakes mounted adjacent a wheel carried on an axle, and wherein each brake include a brake actuator shaft and a mechanism for shifting the brake actuator shaft between a brake-off position and a brake-applied position.

The design of the system is modular. A minimum package, in the preferred embodiment, includes a master station and axle boxes and sensors for a 2-axle vehicle. The customer purchases enough additional axle kits (one per axle) to match the requirements of the vehicle and trailers.

Figure 1:
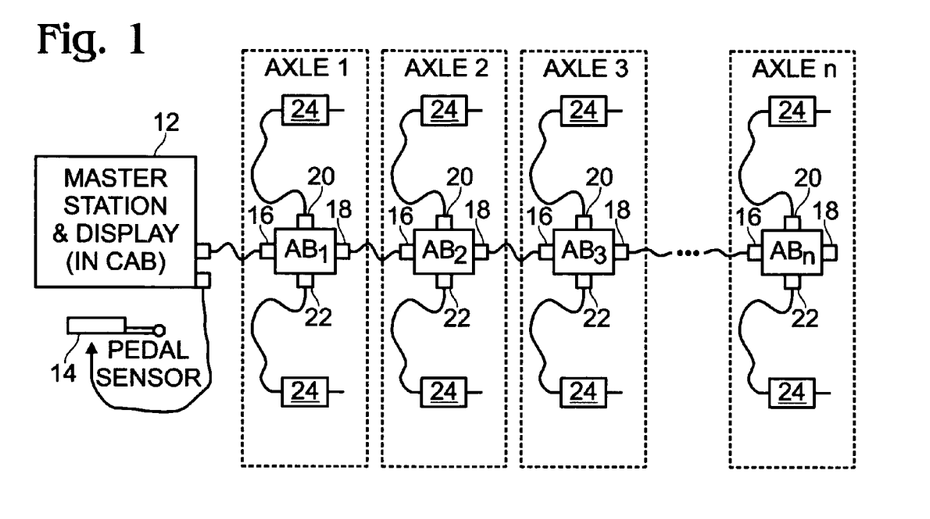
FIG. 1 is a schematic diagram of a brake monitoring system of the invention.

FIG. 1 is a schematic diagram of the system of the invention, generally at 10. The system of the invention includes a master station 12 and a brake pedal sensor 14, usually located in the vehicle cab, adjacent the driver. Associated with each axle is an axle box, AB1, AB2, AB3, . . . ABn. Each axle box has plural connections, and contains, in the preferred embodiment, auto addressing circuitry and sensor interface circuitry. An "upstream" connector 16 goes to either the master station, if the axle box is for the first axle, or to a "downstream" connector 18 of the next axle box forward. "Downstream" connector 18 goes to the next axle box to the rear, if present. Each axle box also has connectors 20, 22, which are connected to brake travel sensors 24, associated with each brake on an axle. In the case when an axle has more than two brakes thereon, additions connections are provided to the axle boxes. This forms a "daisy-chain" including the master station and the axle boxes. Connections between the tractor and trailers are made by using longer cables with quick-disconnect connectors, similar to that currently used for trailer lights and other monitoring systems found on some trailers.

Each axle box contains a local microcontroller, e.g., a microprocessor or a data processor. This microcontroller automatically and continuously reads the brake actuators position's via sensors 24, and stores them in an internal memory. The microcontroller also keeps track of the highest and lowest readings since the last initialize. The microcontroller monitors the incoming messages from the "upstream" cable. A feature of the axle boxes is that they can sense their position in the chain of axles boxes downstream from the master station, and assign themselves addresses, i.e., an auto-addressing function. Thus, communications is "daisy-chained" from the master station through however many axle boxes there are, and be written to or read from only the intended device.

The axle boxes and the daisy-chain cables there between are mounted to the bottom of the trailers, above the related axles. Cables from the sensors are routed from the axle to the bottom of the trailer, following the routing of existing brake airlines, and connected to the axle boxes.

Figure 2:
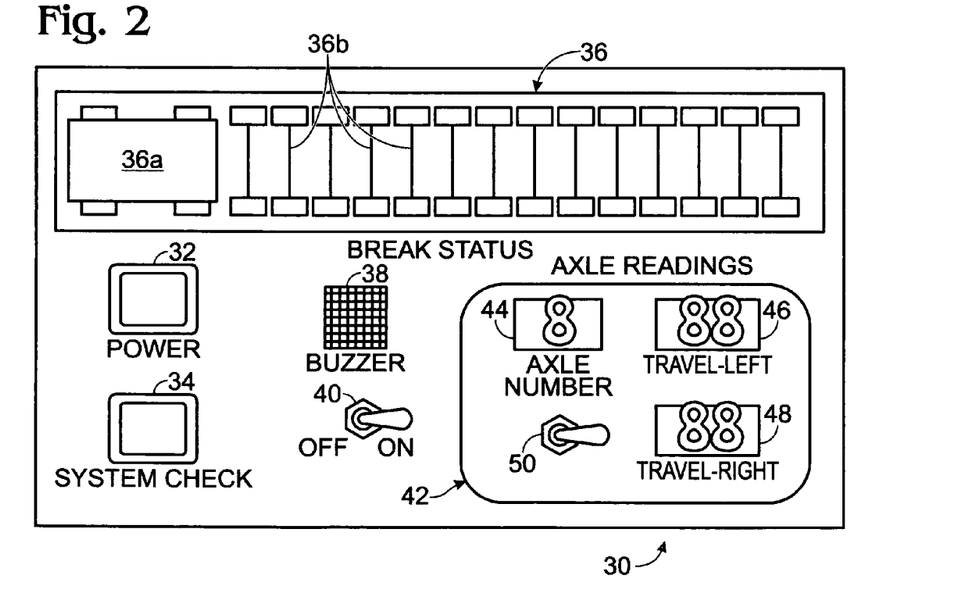
FIG. 2 depicts a master station of the system of the invention.

Referring now to FIG. 2, a master station of the system of the invention is depicted generally at 30. The master station includes, in the preferred embodiment, a power switch 32, a system check switch 34, and a graphical display 36. Graphical display 36 includes a depiction of a tractor 36a and of the axles and wheels 36b on attached trailers. An audible warning device 38 may be activated by on/off switch 40. A numeric display 42 provides an indication of any axle 44, and the left 46 and right 48 brake actuator travel for that axle, which are selected by right/left selector switch 50. Graphical display 36 and numeric display 42 are collectively referred to herein as a master station display.

When master station 30 detects that the brake pedal has been pushed upon receipt of a signal from brake pedal sensor 14, it sends a message to each axle box requesting it to respond with brake travel information. The axle boxes respond by sequentially sending, or transmitting, brake travel information, in the for of a brake condition signal, which is an indication of a safety condition of the brakes associated with the axle box, which brake condition signal includes quantitative information about the travel length of the associated brake actuator shaft, to master station 12. This reading and sending continues as long as the brakes are actuated. As the information is received by the master station, it is presented on display 36, wherein each wheel illuminates as an indication of a brake actuator travel, e.g., in the preferred embodiment, each side of each axle is indicated by 3-color LED indicators. These indicators will glow green for normal travel detected, yellow for marginal travel indication, and red for over-the-limit travel. The master station also checks the incoming information against over travel-alarm limits, and indicates any brake which has marginal or excessive travel on the display. Display 36 is automatically updated depending on the number of axles sensed by the master station via the daisy-chain interconnect system. Once the brakes are released, maximum travel information for all axles is retained, so the operator may check the "Axle Readings" display for each wheel, if desired, at a later time. Audible warning device 38 may take the form of a buzzer or other audible indicator, and is set to sound when any wheel has over-limit travel detected, or when a wheel is within e.g., 20% of its over-limit minimum.

Once properly adjusted brakes are released, the LED indicators will go out, however, any wheels with marginal or over-limit indications will continue to be illuminated. Other arrangements for the operators console are possible. In particular, LCD and electro-luminescent displays may be use.

Master station 12 includes a number of microprocessors which provide for operation of the system. At power-up, or whenever system-check button 34 is pressed, a complete system check is performed by the master station. This check determines how many axle boxes are connected, and if reasonable values are returned from all the sensors. Messages with the results are displayed on the panel.

The entire daisy-chain, master station, and all axle boxes operate at low voltage and current, e.g. ~12V, and draw less than 1 A total for the entire system. Changes in the number of axle boxes present, as when trailers are added or removed, are automatically sensed by master station 12, which automatically reconfigures display 36 and assigns new addresses to the axle boxes. No setup or other action by the operator is ever required.

Long-term data collection may be stored in an internal memory in master station 12, for providing driver diagnostics and accident investigation, e.g., a "Black Box" function. A provided black box has sufficient memory for retaining at least thirty days worth of data about the system. The system of the invention is equipped with a wireless, remote reading capability, which allows inspectors and law enforcement officer to interrogate master station 12 to determine the condition of vehicle brakes. Additionally, in vehicles equipped with satellite communication and monitoring systems, the monitoring system of the invention information, including diagnostic information, may also be provided through satellite communications. In most instances, power is applied to master station 12 upon vehicle startup, and interlocks are provided to prevent driver disablement of the system.

Diagnostics are provided to alert a driver of brake timing and sequencing. A variation of the system of the invention incorporates modified communications between the master station and the axle boxes to use emerging "standardized" truck electronics communications protocol. Other variations of the system of the invention include custom versions for vehicles having more than the maximum number of axles, or for vehicles having more than two brake actuators per axle, or for factory built-in options.

Sensor Mounting

Figure 3:
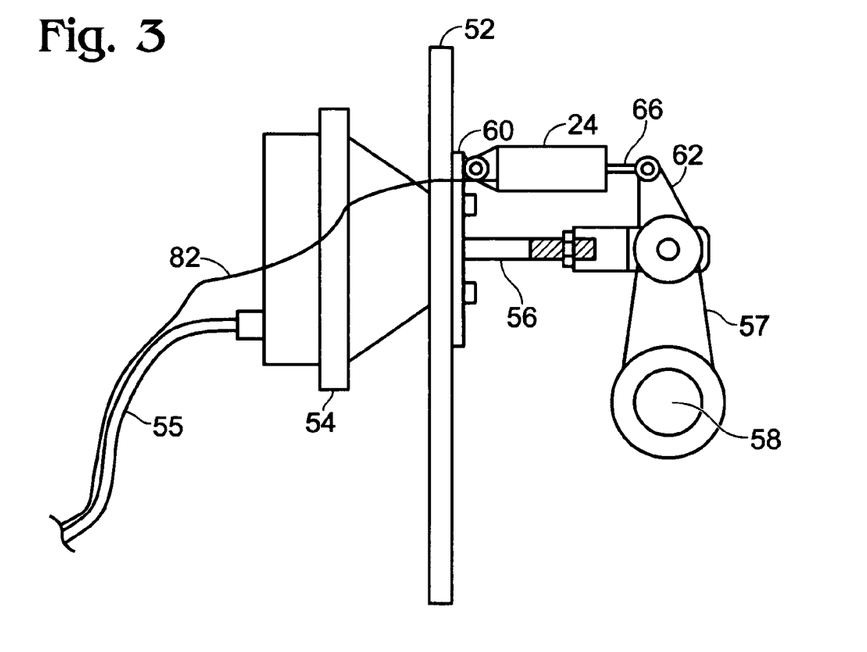
FIG. 3 depicts a sensor mounting scheme of the system of the invention.
Figure 4:
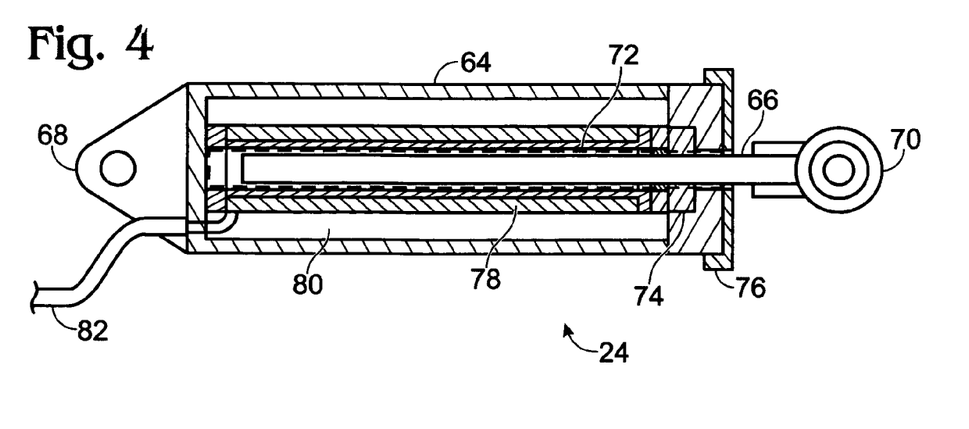
FIG. 4 depicts a cross-section of a sensor of the invention.

Referring now to FIGS. 3 and 4, sensor 24 of the system of the invention is depicted in detail, in a mounted environment in FIG. 3, and in cross-section in FIG. 4. Sensor 24 is specifically designed to be an add-on, to facilitate installing the brake monitoring system on existing vehicles. As shown in FIG. 3, an air cylinder mount 52 is a conventional and standard part of a tractor/trailer, or other pneumatic-brake equipped heavy vehicle. An air cylinder 54 is conventionally carried on mount 52 and connected by an air hose 55 to the vehicle pneumatic system. Air cylinder has a brake actuator shaft 56 extending therefrom, which is connected through a linkage 57 to a brake shaft 58. Shaft 58 operates a mechanism which forces brake pads against a brake drum (not shown), which is used to slow or stop the vehicle. The components of the system of the invention are carried on a sensor bracket 60, which is attached to mount 52. Sensor 24 has one end thereof fixed to sensor bracket 60, and the other, movable end, attached to sensor linkage 62, which is attached to brake actuator shaft 56. The components of the system of the invention in no way affect the operation of the brakes on a vehicle on which they are mounted. Sensors 24 are physically mounted to brake actuator shafts 56, so that sensor 24 directly reads the movement of the actuator shafts.

Sensor Construction and Operation

Sensor 24, and now referring to FIGS. 3 and 4, includes a sensor housing 64, which encloses a sensor core, or arm, 66. A sensor attachment 68 is located at one end thereof, and sensor arm, 66 includes a movable attachment point 70 at the other end thereof. Sensor arm 66 moves within a coil form 72, and is guided by a bushing 74 and a seal 76. A coil 78 is disposed about coil form 72, and the coil, coil form and sensor arm are encapsulated 80 within housing 64. A cable 82 connects each sensor to its associated axle box.

The embodiment of sensor 24 described herein is specifically intended for use in the brake monitoring system of the invention, however, it is applicable to other situations calling for a position sensor with the following characteristics, which are found in the preferred embodiment of sensor 24: moderate accuracy, e.g., +/−0.010", (may be fabricated to more precise standards if required); moderate travel distance for sensor arm, e.g., between about 0" to 6", and easily adjustable; very inexpensive, e.g., estimated to cost about $10.00 per sensor unit; provides an easy interface with a variety of master control units; can accommodate imprecise mounting and/or non-linear motion; insensitive to temperature, humidity, vibration, light, nearby metal surfaces, etc., and suitable for use in extreme environments.

Known position sensor technologies fail to meet one or more of the forgoing criteria. For example, linear optical encoders are fragile and must be carefully protected and shielded. Linear variable differential transducer (LVDT) sensors meet some of the above requirements but are expensive. Proximity sensors are limited to very short sensing distances and are affected by nearby metallic objects. Ultrasonic sensors cannot easily be used at these shorter distances and are affected by dirt, moisture, or other contaminants on the reflecting surface.

Optical sensors can be obscured by dirt or moisture. Linear or rotary (with linkages) potentiometer are easily damaged by dust or moisture, etc. Hall-effect sensors have limited operating range, and are temperature sensitive, etc.

The sensor of the system of the invention uses variable inductance of an iron-core coil. These iron or ferrite core coils are variable, in order to tune or change the frequency or time-constant of associated electronic equipment; e.g., to tune the frequency of the local oscillator in a radio receiver.

The operation of this sensor is explained in connection with FIGS. 3 and 4, and in the context of a brake monitoring system for heavy vehicles. Sensor 24 coil 80 is of a length slightly longer than the travel distance to be sensed. Sensor arm 66 is arranged in bushing 74, or mounted in a bearing, such that it can move into (brake-off position), or out (brake-applied position) of, coil form 72 with the "fully-in" position corresponding to one measurement limit, and the "fully-out" position corresponding to the other measurement limit. The amount of sensor arm 66 which is within the coil determines the inductance of the coil. The associated interface electronics measures this inductance to determine this amount, and thus the distance to be measured.

Figure 5:
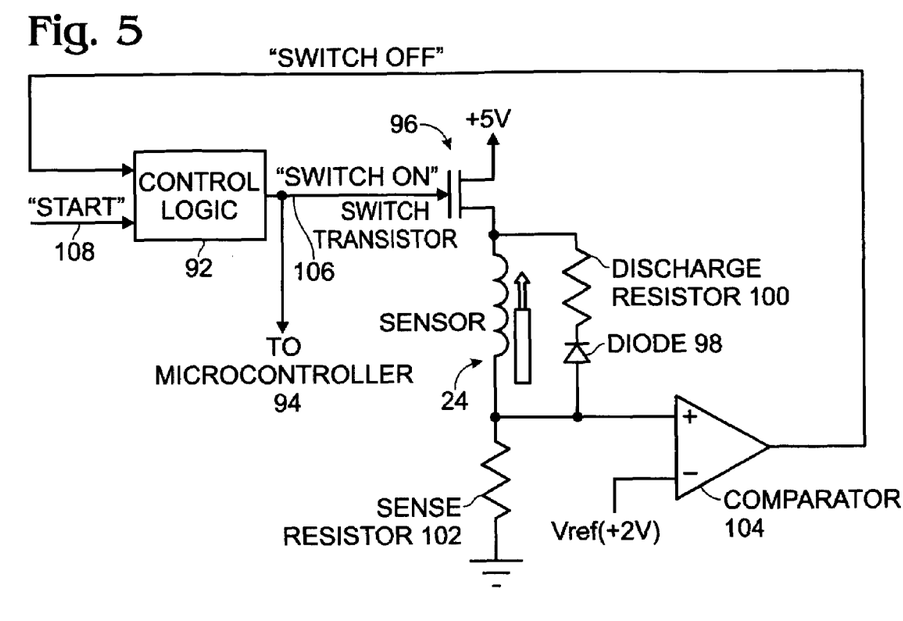
FIG. 5 is a schematic of sensor interface electronics.

There are a number of ways to electrically measure the instantaneous inductance of such a coil. One method, which is used in the preferred embodiment, is to apply a voltage across the coil and measure the rise-time of the current. A schematic of such an interface circuit is depicted in FIG. 5, generally at 90, which circuit is contained with an axle box, in the preferred embodiment. Circuit 90 includes a control logic portion 92, likely a separate integrated circuit, or formed on an IC with a microprocessor 94. A switch transistor 96 opens and closes the circuit, which includes a sensor 24 in parallel with a diode 98 and a resistor 100 combination. A sense resistor 102 and a comparator 104 complete this embodiment of the interface circuit.

Initially "Switch On" signal 106 is inactive. Therefore, switch transistor 96 is off, and no current flows through the sensor or sense resistor 102. The voltage at the +input of comparator 104 is thus 0V, and the comparator output is low.

At periodic times, set in master station 12 according to how often the sensor is to be read, a "Start" signal 108 pulses high. This causes control logic 92 to set "Switch On" signal 106 high, or true. This turns switch transistor 96 on, and current begins to flow from the +5V supply through sensor 24 and sense resistor 103. Current starts at zero, and gradually builds according to:

$$I=5V/R^{*}(1-e^{-(tR/L)}) \quad (1)$$

where t is the elapsed time since "Start", R is the combined resistance of sense resistor 102 and sensor 24, and L is the inductance of sensor 24.

As the current builds up, a voltage drop results across sense resistor 102. At some later time, as determined by the value L of sensor 24, the voltage across sense resistor 102 is equal to $V_{ref}$, which in this case is +2V. At that instant in time, the comparator output switches high, e.g., signal "Switch Off", which causes control logic 92 to terminate the "Switch On" pulse. The output of sensor interface circuit 90 is the "Switch On" signal, and it can easily be seen that for every "Start" pulse, there will be a pulse on the "Switch On" signal whose length is proportional to the time it takes the current in sensor 24 to build up to a known value, determined by $V_{ref}$. This time in turn is proportional to the value of the inductance of sensor 24, and thus to the position of the arm 66 in sensor 24. Discharge resistor 100 and diode 98 serve to discharge the current in the inductor (coil 78) after the end of the "Switch On" period, preparing circuit 90 for the next "Start" pulse.

As incorporated into the monitoring system of the invention, all of circuit 90, except sensor 24, is located in an axle box. The microcontroller in the circuit emits the "Start" pulse, and at the same time starts a digital timer. At the end of the "Switch On" period, the value in the digital timer can be read, and converted to a position measurement by the microcontroller. In other applications for the sensor, this function may be performed by some other microcontroller, microprocessor, or dedicated logic.

There are other methods of reading the variable inductance than interface circuit 90, which is only one embodiment. For example, the coil may be driven with a sine wave connected to a resistor, wherein the frequency roll-off point is proportional to the inductance. Other shapes of coils, and other types of core materials, such as ferrite, may be used.

Figure 6:
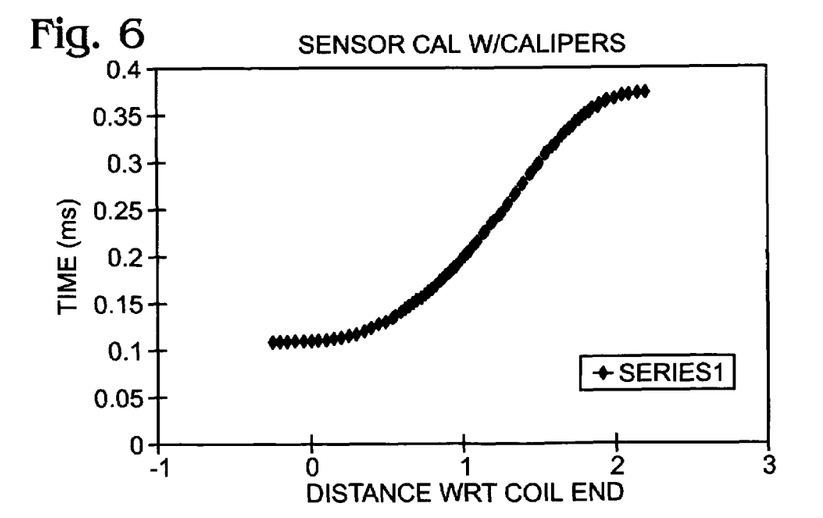
FIG. 6 depicts a typical sensor transfer function.

A typical sensor transfer function is shown in FIG. 6, depicting a position vs "Switch On" time (in microseconds) for a sensor having a nominal travel of two inches. As can be seen, the time vs position curve is not a straight line, however, it is a simple curve which may easily be linearized by the microcontroller or system software. The reading system of the system of the invention is simple, robust, and has very low sensitivity to external variables. It is nearly insensitive to temperature changes and has a low sensitivity to power supply fluctuations and noise, because such variations tend to be averaged out by the inductor. The sensor itself connects to the axle box via 2-wire cable 84, which may be shield cable or non-shielded cable, which is also is insensitive to noise. Accuracy is determined primarily by the uniformity of the sensing coil, the material of the iron core of arm 66, which, in the preferred embodiment, is formed of 416 stainless steel, the value of the Sense Resistor, and of $V_{ref}$. All these things are easily controlled, and provide an accuracy better than 0.010 inches. Higher accuracy may be achieved by finer tolerance coil fabrication. Vibration, moisture and dirt, and other environmental issues have little or no effect on sensor 24, unless they become so severe as to physically inhibit the motion of the arm 66 in coil 78, which restriction may easily be prevented by seal 76.

There are no expensive, or difficult-to-fabricate, components in the sensing system. The physical components of the sensor itself are primarily the coil, sensor arm, and housing, all of which are readily adaptable to automated manufacturing. The coil, for example, in the preferred embodiment, is a two-layer winding of 30-gauge wire having 400 turns. The electronic interface components are simple and inexpensive. If other applications require a separate microcontroller to manage the sensor, a very simple one, about one dollar, is more than adequate.

Automatic and Adaptive Addressing System

The problem of addressing variable numbers of axle controllers in a brake-travel monitoring system of the invention is a general one applicable to any system having a single master station and many slave stations in which a "daisy-chain" interconnect system is used.

If a master station is required to communicate with a number of slave stations, there needs to be some means of identifying for which slave station a particular communication is intended. This need applies to the master station and slave stations equally, which need to know when a particular communication is intended for them. Typically, this problem is solved by establishing a unique address, or designator, for each slave station. Thus, when a master station sends a message to, or requests a read from, e.g., slave station #3, only the device with the address of "3" will respond. This problem does not exist if the master station has a unique connection to each slave station. However, such a system is relatively expensive because it requires a number of parallel cables and slave station connections. More common are communications in which either there is a common "party-line," to which all the slaves stations are connected, e.g., EtherNet®, or systems which are "daisy-chained," wherein each slave station receives a connection from an "upstream" device and passes a connection to a "downstream" device. The current invention incorporates, in the preferred embodiment, a "daisy-chain" protocol.

Most daisy-chain protocol systems require some explicit action in order to select and assign addresses to each slave station. Typical methods of doing this are via unique EPROM-based serial numbers, as used by most EtherNet® devices, or by "dip-switches," as used by general purpose interface bus (GPIB) systems.

The system of the invention, as described above for a brake travel monitoring system, has additional constraints. One of the most important is that the daisy-chain interconnect between the master station and first downstream slave station, and between slave stations themselves, use a cable with a minimum number of wires. For the same reason, all cables are identical in the system. The system is self-configuring, so that the addressing of entities in the daisy-chain, such as axle boxes, require no action by the user/operator, and ideally no action by the master station. The system of the invention disclosed herein meets these objectives.

In the preferred embodiment, a protocol wherein a signal is sent from the master station to the first slave station, i.e., AB1, is used. The slave station reads the signal and determines that it is the first device in the chain based on the content of this signal. The slave station then modifies this signal and sends it on to the next downstream slave station. The next slave station reads the signal, and based on the signal modification noted above, determines that it is the second device in the chain. The slave station makes an identical modification to the signal and sends it downstream to the third element in the chain, etc. The characteristics of the signal are such that repetitive modifications of an identical nature result in unique and predictable changes. There are a number of ways to do this, but based on the "minimum number of wires" constraint, it is clear that a system that requires only one additional wire to the daisy-chain interconnect is desirable. Systems which are capable of performing this protocol are analog and serial-digital protocols. The preferred embodiment described herein uses an analog protocol, which is the simpler case of the two, and which will be described in greater detail later herein.

The serial-digital protocol is, however, equally feasible, and is readily implemented by one of ordinary skill in the art, e.g., the master station may send, via an RS232-type protocol, or any other serial protocol, a digitally-encoded number, such as "0" to the first slave station. The first slave station adds "1" to the number, and sends it to the next slave station, which in turn adds "1" to the number, and sends it to the third slave station, etc. Once this protocol has been implemented, each slave station will "know" it's address, based on how many slave stations are upstream from it. While this protocol is completely practical, it does require that a digital serial interface be replicated between each slave/master station. This is not particularly simple, and may require a considerable amount of additional software in the microcontroller of each slave station. Also, it may not be used in a system lacking a complicated state machine or microcontroller in each slave station.

The analog protocol embodiment of the system of the invention does not have the complexity of the serial-digital protocol. In the analog protocol, a known voltage is sent down a single "addressing" wire from the master station, e.g., 10.0 VDC. The first slave station reads this voltage, and notes that because the voltage has a value of 10V, the slave station must be the first slave station in the daisy-chain. Each slave station subtracts a fixed voltage from the input, and sends the resulting voltage on to the next slave station. Each slave station may determine, from reading the voltage, how many slave stations are between it and the master station, and thus determine its address. In practice, a simple way to subtract a fixed voltage is to insert a diode and buffer between the "addressing-in" and "addressing-out" ports of the slave station. This results in the voltage on the addressing-out line to the second slave station to be 10.0V-0.65V (typical diode drop), or 9.35V.

Figure 7:
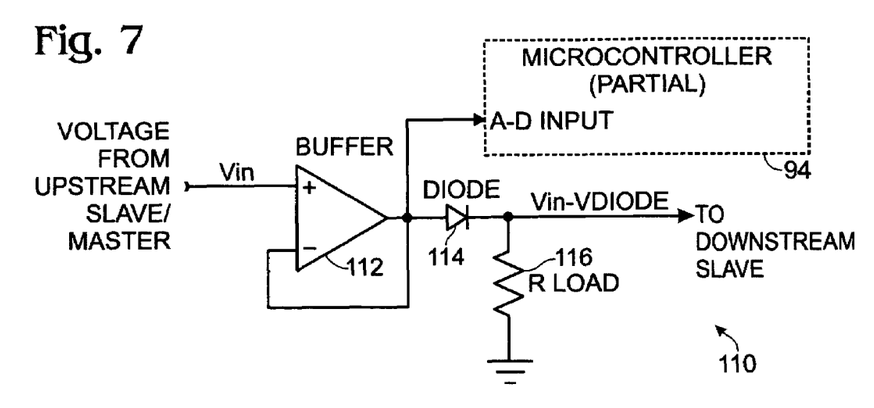
FIG. 7 depicts a basic addressing circuit of the system of the invention.

The second slave station will look this up, either digitally, after an A/D conversion, or via analog comparators, and determine that it has as an address #2. It will again subtract, via a diode, another 0.65V, resulting in a voltage of 8.7V, and send the signal to the third slave station, etc. A schematic of a basic addressing circuit in a slave station of the system of the invention is shown in FIG. 7, generally at 110. Circuit 110 includes a comparator 112, a diode 114 and a resistor 116. To function properly, diode drops and/or other subtracted voltages must be predictable. Conventional silicon diodes have forward drops that are approximately constant, and depend primarily on temperature, with a slight variation related to current flow. For systems with a small number, e.g., four, of slave stations, these effects may be ignored. In systems with a higher number of slave stations, it is necessary to keep these forward drops predictable and constant.

Figure 8:
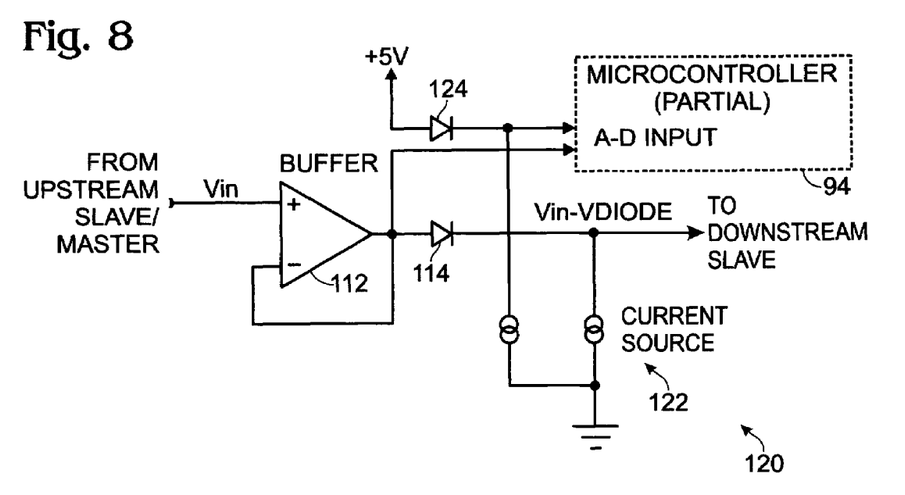
FIG. 8 depicts a variation of an addressing circuit of the system of the invention.

A simple modification to the addressing circuit of the system of the invention is depicted in FIG. 8, generally at 120, and allows the microcontroller to measure a typical diode drop, and to use this value to correct for actual diode drops. Another part of this embodiment of the system of the invention includes replacing resistor 116 with a current source 122, and providing a diode 124 between a +5V source and microcontroller 94. By using current source 122, all diodes in the daisy chain operate at approximately the same current. Because the axle boxes are on the same vehicle, the diodes are all at approximately the same temperature. Diodes of a similar type, operating at similar currents and temperatures, all have very similar voltage drops. Diode 124 and current source 122 are used as a reference by microcontroller 94, which measures the voltage drop across diode 124, and uses the voltage drop and the incoming voltage to calculate the current address. Essentially, the microcontroller subtracts the incoming voltage from +10V, in this example, and divides the difference by the measured diode drop. This tells the microcontroller how many axle boxes are present between it and the master station, and thus allows the microcontroller to know its address.

Additional features may be incorporated into the system of the invention, such as buffering at the output instead of the input of each slave station; some means other than a diode used for subtracting fixed voltages; use of comparators to read the voltage instead of an A/D channel of a microcontroller, and measurement of current versus voltage on the addressing wire.

Thus, a brake monitoring system for heavy vehicles has been disclosed. It will be appreciated that further variations and modifications thereof may be made within the scope of the invention as defined in the appended claims.

We claim:

1. A brake monitoring system for use on a motor vehicle, wherein the vehicle includes plural, powered brakes mounted adjacent a wheel carried on an axle, and wherein each brake include a brake actuator shaft and a mechanism for shifting the brake actuator shaft between a brake-off position and a brake-applied position, comprising:
   a sensor connected to each brake actuator shaft on the motor vehicle for monitoring the position and travel of the brake actuator shaft and for generating and transmitting a brake condition signal representative of a safety condition of the brake associated with the brake actuator shaft, wherein said brake condition signal includes quantitative information about the length of travel of the brake actuator shaft;
   a data processor connected to sensors associated with brakes for each axle for receiving, interpreting, storing, and upon request, transmitting said brake condition signal, wherein each data processor includes an auto-address mechanism to identify its position on the vehicle;
   a master station, wherein said master station includes a display for identifying a particular vehicle brake, a quantitative indication of the travel on the brake actuator shaft associated with the particular brake, and visual indicating devices which include plural indicating mechanism indicia which are indicative of said safety condition of a particular brake, including visual and auditory indicating devices connected to said data processor for warning a vehicle operator of said safety condition of the brakes on the vehicle, wherein said visual indicating devices provide both quantitative and qualitative output to the motor vehicle operator for every brake on the vehicle, wherein said master station includes a function selector located in said master station for selecting the various axles on the vehicle for display of brake condition for a selected axle, wherein power is applied to said master station upon vehicle startup, and interlocks are provided to prevent driver disablement of the system.

2. The system of claim 1 wherein said auto-address mechanism includes a protocol wherein an address signal is sent from the master station to the first axle box;
   the first axle box reads the address signal and determines that it is the first axle box in the system based on the content of said address signal and addresses itself as axle box one; the first axle box modifies said address signal to a second address signal and sends it to the next downstream axle box which reads the second address signal and determines that it is the second axle box in the system based on the content of said second address signal and addresses itself as axle box two, and wherein the protocol is repeated until all axle boxes are addressed.

3. The system of claim 2 wherein the auto-address mechanism uses a serial-digital protocol, wherein the master station a digitally-encoded number to the first axle box, which address itself as the first axle box and adds "1" to the number, and sends it to the next axle box, which address itself as the second axle box and adds "1" to the number, and sends it to other axles boxes in the system until all axles boxes are addressed.

4. The system of claim 2 wherein the auto-address mechanism uses an analog protocol, wherein a known voltage is sent by the master station on an addressing wire to the first axle box, which reads this voltage, and determines it address as a function of the voltage, and wherein the first axle box subtracts a predetermined voltage from known voltage resulting in a second known voltage, and sends the second known voltage to the next axle box, which determines its address as a function of the second known voltage, and wherein each axle box subtracts a predetermined voltage from the known voltage, and sends the resulting voltage on to the next axle box until all axle boxes are addressed.

5. The system of claim 1 wherein, once properly adjusted brakes are released, the indicating mechanism indicia go out, and wherein the indicia for any out-of adjustment brake remain illuminated.

6. The system of claim 1 wherein changes in the number of axle boxes present are automatically sensed by said master station, which automatically reconfigures said master station display and assigns new addresses to the axle boxes.

7. The system of claim 1 wherein long-term data collection is stored in an internal memory in the master station.

8. The system of claim 7 wherein the system includes a wireless, remote reading capability for interrogation from a remote location to determine the condition of vehicle brakes.

9. The system of claim 1 wherein said sensor uses variable inductance of an iron-core coil to determine brake actuator arm travel.

10. The system of claim 1 wherein said sensor provides an inductance and wherein said data processor includes a sensor interface circuit for measuring the instantaneous inductance of a coil in the sensor by application of a voltage across the coil and measuring the rise-time of the current.

11. The system of claim 1 wherein said sensor provides an inductance and wherein said data processor includes a sensor interface circuit for measuring the instantaneous inductance of a coil in the sensor by application of a sine wave connected to a resistor, and wherein the frequency roll-off point is proportional to the inductance of a coil in the sensor.

12. A brake monitoring system for use on a motor vehicle, wherein the vehicle includes plural, powered brakes mounted adjacent a wheel carried on an axle, and wherein each brake include a brake actuator shaft and a mechanism for shifting the brake actuator shaft between a brake-off position and a brake-applied position, comprising:
   a sensor connected to each brake actuator shaft on the motor vehicle for monitoring the position and travel of the brake actuator shaft and for generating and transmitting a brake condition signal representative of a safety condition of the brake associated with the brake actuator shaft, wherein said brake condition signal includes quantitative information about the length of travel of the brake actuator shaft;
   a data processor connected to sensors associated with brakes for each axle for receiving, interpreting, storing, and upon request, transmitting said brake condition signal, wherein each data processor includes an auto-address mechanism to identify its position on the vehicle, wherein said auto-address mechanism includes a protocol wherein an address signal is sent from a master station to the first axle box;

the first axle box reads the address signal and determines that it is the first axle box in the system based on the content of said address signal and addresses itself as axle box one; the first axle box modifies said address signal to a second address signal and sends it to the next downstream axle box which reads the second address signal and determines that it is the second axle box in the system based on the content of said second address signal and addresses itself as axle box two, and wherein the protocol is repeated until all axle boxes are addressed; and a master station, wherein said master station includes a display for identifying a particular vehicle brake, a quantitative indication of the travel on the brake actuator shaft associated with the particular brake, and visual indicating devices which include plural indicating mechanism indicia which are indicative of said safety condition of a particular brake, including visual and auditory indicating devices connected to said data processor for warning a vehicle operator of said safety condition of the brakes on the vehicle, wherein said visual indicating devices provide both quantitative and qualitative output to the motor vehicle operator for every brake on the vehicle, wherein said master station includes a function selector located in said master station for selecting the various axles on the vehicle for display of brake condition for a selected axle.

13. The system of claim 12 wherein the auto-address mechanism uses a serial-digital protocol, wherein the master station a digitally-encoded number to the first axle box, which address itself as the first axle box and adds "1" to the number, and sends it to the next axle box, which address itself as the second axle box and adds "1" to the number, and sends it to other axles boxes in the system until all axles boxes are addressed.

14. The system of claim 12 wherein the auto-address mechanism uses an analog protocol, wherein a known voltage is sent by the master station on an addressing wire to the first axle box, which reads this voltage, and determines it address as a function of the voltage, and wherein the first axle box subtracts a predetermined voltage from known voltage resulting in a second known voltage, and sends the second known voltage to the next axle box, which determines its address as a function of the second known voltage, and wherein each axle box subtracts a predetermined voltage from the known voltage, and sends the resulting voltage on to the next axle box until all axle boxes are addressed.

15. The system of claim 12 wherein changes in the number of axle boxes present are automatically sensed by said master station, which automatically reconfigures said master station display and assigns new addresses to the axle boxes.

16. The system of claim 12 wherein said sensor provides an inductance and wherein said data processor includes a sensor interface circuit for measuring the instantaneous inductance of a coil in the sensor by application of a voltage across the coil and measuring the rise-time of the current.

17. The system of claim 12 wherein said sensor provides an inductance and wherein said data processor includes a sensor interface circuit for measuring the instantaneous inductance of a coil in the sensor by application of a sine wave connected to a resistor, and wherein the frequency roll-off point is proportional to the inductance of a coil in the sensor.

18. The system of claim 12 wherein, once properly adjusted brakes are released, the indicating mechanism indicia go out, and wherein the indicia for any out-of adjustment brake remain illuminated.

19. The system of claim 12 wherein long-term data collection is stored in an internal memory in master station, and wherein the system of the invention includes a wireless, remote reading capability for interrogation from a remote location to determine the condition of vehicle brakes.

* * * * *